(12) United States Patent
Froggatt et al.

(10) Patent No.: US 9,025,158 B2
(45) Date of Patent: May 5, 2015

(54) INTERFEROMETRIC MEASUREMENT WITH CROSSTALK SUPPRESSION

(75) Inventors: Mark E. Froggatt, Blacksburg, VA (US); Justin W. Klein, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 774 days.

(21) Appl. No.: 13/113,761

(22) Filed: May 23, 2011

(65) Prior Publication Data

US 2011/0310378 A1 Dec. 22, 2011

Related U.S. Application Data

(60) Provisional application No. 61/350,343, filed on Jun. 1, 2010.

(51) Int. Cl.
*G01B 9/02* (2006.01)
*G01D 5/353* (2006.01)

(52) U.S. Cl.
CPC ........ *G01B 9/02027* (2013.01); *G01D 5/35309* (2013.01); *G01D 5/3538* (2013.01); *G01B 9/02004* (2013.01); *G01B 9/02056* (2013.01); *G01B 2290/45* (2013.01)

(58) Field of Classification Search
CPC ........... G01B 9/02027; G01B 9/02056; G01B 9/02058; G01B 11/161; G01B 11/2441
USPC .................................................. 356/477, 478
See application file for complete search history.

(56) References Cited

U.S. PATENT DOCUMENTS

| 4,697,926 A | 10/1987 | Youngquist |
| 4,748,686 A * | 5/1988 | Glomb .......................... 398/168 |

(Continued)

FOREIGN PATENT DOCUMENTS

| CN | 1841027 A | 10/2006 |
| CN | 1954218 A | 4/2007 |

(Continued)

OTHER PUBLICATIONS

International Search Report and Written opinion mailed Feb. 9, 2012 in corresponding Application No. PCT/US2011/037518.

(Continued)

*Primary Examiner* — Jonathan Hansen
*Assistant Examiner* — Jonathon Cook

(57) ABSTRACT

An interferometric measurement system suppresses cross talk between optical waveguides used to measure one or more parameters. A first interferometric measurement channel coupled to a first waveguide, and a second interferometric measurement channel coupled to a second waveguide. At least one of the channels includes a reference light path in addition to the first and second waveguides. A reference path optical delay is associated with the reference light path, a first optical delay is associated with the input portion of at least one of the first and second interferometric measurement channels, and a second optical delay is associated with an output portion of the one interferometric measurement channel. A value of the first optical delay and a value the second optical delay are chosen to suppress crosstalk associated with the other of the first and second interferometric measurement channels in the one interferometric measurement channel over a predetermined length of the first waveguide. Signals corresponding to the reference light path and the first and second interferometric measurement channels are processed to measure one or more parameters.

25 Claims, 17 Drawing Sheets

(56) References Cited

U.S. PATENT DOCUMENTS

| | | | |
|---|---|---|---|
| 4,761,073 | A | 8/1988 | Meltz et al. |
| 5,798,521 | A | 8/1998 | Froggatt |
| 5,987,197 | A | 11/1999 | Kersey |
| 6,141,098 | A | 10/2000 | Sawatari et al. |
| 6,301,420 | B1 | 10/2001 | Greenaway et al. |
| 6,389,187 | B1 | 5/2002 | Greenaway et al. |
| 6,545,760 | B1 | 4/2003 | Froggatt et al. |
| 6,621,956 | B2 | 9/2003 | Greenaway et al. |
| 6,856,400 | B1 | 2/2005 | Froggatt |
| 6,888,623 | B2 | 5/2005 | Clements |
| 6,900,897 | B2 | 5/2005 | Froggatt |
| 7,027,699 | B2 | 4/2006 | Tao et al. |
| 7,042,573 | B2 | 5/2006 | Froggatt |
| 7,324,714 | B1 | 1/2008 | Cranch et al. |
| 7,330,245 | B2 | 2/2008 | Froggatt |
| 7,379,168 | B2 | 5/2008 | Froggatt et al. |
| 7,440,087 | B2 | 10/2008 | Froggatt et al. |
| 7,538,883 | B2 | 5/2009 | Froggatt |
| 7,664,347 | B2 | 2/2010 | Childers et al. |
| 7,720,322 | B2 | 5/2010 | Prisco |
| 7,772,541 | B2 | 8/2010 | Froggatt et al. |
| 7,781,724 | B2 | 8/2010 | Childers et al. |
| 7,813,599 | B2 | 10/2010 | Moore |
| 7,815,376 | B2 | 10/2010 | Rogers et al. |
| 7,930,065 | B2 | 4/2011 | Larkin et al. |
| 8,183,520 | B2 | 5/2012 | Prisco |
| 8,400,620 | B2 | 3/2013 | Froggatt et al. |
| 8,531,655 | B2 | 9/2013 | Klein et al. |
| 8,773,650 | B2 | 7/2014 | Froggatt et al. |
| 8,842,963 | B2 | 9/2014 | Wysocki et al. |
| 2001/0017971 | A1 | 8/2001 | Iwata et al. |
| 2005/0089326 | A1 | 4/2005 | Regev et al. |
| 2006/0013523 | A1 | 1/2006 | Childers et al. |
| 2006/0061770 | A1* | 3/2006 | Erskine .......... 356/484 |
| 2006/0152733 | A1* | 7/2006 | Waagaard ...... 356/478 |
| 2011/0202069 | A1 | 8/2011 | Prisco et al. |
| 2011/0301455 | A1* | 12/2011 | Numajiri et al. ..... 600/425 |
| 2012/0062901 | A1* | 3/2012 | Yoshida et al. ..... 356/479 |
| 2014/0320846 | A1 | 10/2014 | Froggatt et al. |

FOREIGN PATENT DOCUMENTS

| | | |
|---|---|---|
| JP | H0293503 A | 4/1990 |
| WO | WO-0233464 A1 | 4/2002 |

OTHER PUBLICATIONS

International Preliminary Report on Patentability mailed Dec. 13, 2012 in corresponding Application No. PCT/US2011/037518.
U.S. Appl. No. 12/874,901, Froggatt et.al. "Optical Position and/or Shape Sensing", filed Sep. 2, 2010. assignee Luna Innovations.
U.S. Appl. No. 13/149,206 Froggatt et.al., "Registration of an Extended Reference for Parameter Measurement in an Optical Sensing System", filed May 31, 2011, assignee Luna Innovations.
U.S. Appl. No. 13/233,577 Froggatt et.al., "Compensating for Non-Ideal Multi-Core Optical Fiber Structure", filed Sep. 15, 2011.
U.S. Appl. No. 12/839,642, Prisco et.al, "Method and Systen for Absolute Three-Dimensional Measurements Using a Twist-Insensitive Shape Sensor", filed Jul. 20, 2010. assignee Intuitive Surgical.
U.S. Appl. No. 13/073,295, Younge et.al. "Optical Fiber Shape Sensing Systems" filed Mar. 28, 2011. assignee Philips.
U.S. Appl. No. 12/106,254, Younge et.al. "Optical Fiber Shape Sensing Systems" filed Apr. 18, 2008. assignee Hansen.
U.S. Appl. No. 12/618,000, Prisco "Optical Shape Sensor Calibration", filed Nov. 13, 2009 assignee Intuitive Surgical.
U.S. Appl. No. 12/614,309 Askins, "Method and Apparatus for Measuring Fiber Twist by Polarization Tracking", filed Nov 6, 2009, assignee US NRL.
U.S. Appl. No. 12/236,478, Udd., "Optical Fiber Grating Sensors and Methods of Manufacture", filed Sep. 23, 2008, assignee Hansen.
U.S. Appl. No. 11/690,116, Schlesinger et al., "Fiber Optic Instrument Sensing System" filed Mar. 22, 2007, assignee Hansen.
U.S. Appl. No. 13/222,577, Wysocki et.al., "Reducing Reflection at Termination of Optical Fiber in a Small Volume," filed Aug 31, 2011, assignee Luna Innovations.
Roger Duncan, "Fiber GPS", SPIE's OE Magazine, Sep. 2005, p. 18-21, vol. 5, No. 8, SPIE, US.
Duncan, R. et al., "Characterization of a Fiber-Optic Shape and Position Sensor," SPIE International Symposium on Smart Structures and Materials, Proc. SPIE 6167-4 (2006).
Duncan, R. et al., "Fiber-Optic Shape and Position Sensing," Proceedings of the 5th International Conference on Structural Health Monitoring (2005).
Duncan, R. et al., "High-Accuracy Fiber-Optic Shape Sensing," SPIE International Symposium on Smart Structures and Materials, Proc. SPIE 6530-650 (2007).
C. G. Askins, T. F. Taunay, G. A. Miller, B. M. Wright, J. R. Peele, L. R. Wasserman, and E. J. Friebele, Inscription of Fiber Bragg Gratings in Multicore Fiber, in Nonlinear Photonics, OSA Technical Digest (CD) (Optical Society of America, 2007), paper JWA39.
C. G. Askins, G. A. Miller, and E. J. Friebele, "Bend and Twist Sensing in a Multiple-Core Optical Fiber," in Optical Fiber Communication Conference and Exposition and The National Fiber Optic Engineers Conference, OSA Technical Digest (CD) (Optical Society of America, 2008), paper OMT3.
G.A. Cranch, G. M. H. Flockhart, W. N. MacPherson, J. S. Barton, C.K. Kirkendall, "Ultra-high-sensitivity two-dimensional bend sensor," Elec. Lett. 42, 520-522 (2006).
G. A. Cranch, G. M. Flockhart, W. N. MacPherson, J. S. Barton, and C. K. Kirkendall, "Ultra-High Sensitivity Curvature Sensor Based on Bragg Grating Defined Interferometric Cavities Formed in Multicore Fiber," in Optical Fiber Sensors, OSA Technical Digest (CD) (Optical Society of America, 2006), paper ThB3.
G. M. H. Flockhart, W. N. MacPherson, J. S. Barton, J. D. C. Jones, L. Zhang, and I. Bennion, "Two-axis bend measurement with Bragg gratings in multicore optical fiber," Opt. Lett. 28, 387-389 (2003).
Gordon M. H. Flockhart, Geoffrey A. Cranch and Clay K. Kirkendall, "Differential phase tracking applied to Bragg gratings in multicore fiber for high-accuracy curvature measurement", Proc. SPIE 6167, 616701 (2006).
G. M. H. Flockhart, G.A. Cranch, C.K. Kirkendall, "Differential phase tracking applied to Bragg gratings in multi-core fibre for high accuracy curvature measurement," Elec. Lett. 42, 390-391 (2006).
Gary A. Miller, Charles G. Askins and E. Joseph Friebele, "Shape sensing using distributed fiber optic strain measurements", Proc. SPIE 5502, 528 (2004).
Donghui Zhao et al, "Implementation of vectorial bend sensors using long-period gratings UV-inscribed in special shape fibres" 2004 Meas. Sci. Technol. 15 1647.
William N MacPherson et al, "Pitch and roll sensing using fibre Bragg gratings in multicore fibre" 2004 Meas. Sci. Technol. 15 1642.
P.M. Blanchard et al., Two-Dimensional Bend Sensing with a Single, Multi-Core Optical Fiber, Smart Mater. Struct., 2000, p. 132-140, vol. 9.
Sandra M. Klute, et al., "Fiber-Optic Shape Sensing and Distributed Strain Measurements on a Morphing Chevron," American Institute of Aeronautics and Astronautics, 2006, pp. 1-23.
Joseph R. Blandino et al., "Three-Dimensional Shape Sensing for Inflatable Booms," Proceedings of the 46th AIAA/ASME/ASCE/Ahs/ASC Structures, Structural Dynamics and Materials Conference, 2005.
Froggatt, Mark and Jason Moore, "Distributed measurement of static strain in an optical fiber with multiple Bragg gratings at nominally equal wavelengths," Journal of Applied Optics, Apr. 1, 1998, vol. 37, Issue 10, pp. 1741-1746.
International Preliminary Report on Patentability and Written Opinion for Application No. PCT/US2010/002517, mailed on Mar. 20, 2012, 5 pages.
International Search Report and Written Opinion for Application No. PCT/US2011/038512, mailed on Feb. 9, 2012, 8 pages.
International Search Report and Written Opinion for Application No. PCT/US2010/002517, mailed on Jun. 1, 2011, 6 pages.
International Search Report and Written Opinion for Application No. PCT/US2011/049934, mailed on Mar. 28, 2012, 6 pages.
Office Action and English Translation mailed Jan. 23, 2014 for Chinese Application No. CN201080041709.6.

* cited by examiner

INTERFEROMETRIC MEASUREMENT WITH CROSSTALK SUPPRESSION

PRIORITY APPLICATION

This application claims priority from U.S. provisional patent application Ser. No. 61/350,343, filed on Jun. 1, 2010, the contents of which are incorporated herein by reference.

TECHNICAL FIELD

The technology relates to interferometric measurements and applications thereof.

BACKGROUND

Optical time domain measurements with high resolution and high sensitivity may be achieved using Optical Frequency Domain Reflectometry (OFDR). OFDR measurement technology enables many several important fiber-optic sensing technologies. One non-limiting example is distributed strain sensing. For example, commonly-owned, U.S. patent application Ser. No. 12/874,901, filed on Jul. 23, 2010, entitled "Optical Position and/or Shape Sensing," incorporated herein by reference, describes how to use the intrinsic properties of optical fiber to enable very accurate shape calculation. In essence, the fiber position is determined by interpreting the back reflections of laser light scattered off the glass molecules within the fiber. This scatter is referred to herein as Rayleigh scatter. A change in optical length is detected in ones of the cores in the multi-core fiber up to a point on the multi-core fiber. A location and/or a pointing direction are/is determined at the point on the multi-core fiber based on the detected changes in optical length. This measurement of position and/or direction using a multi-core fiber can be performed quickly, with a high resolution, and to a high degree of accuracy.

In FIG. 1, a continuous Rayleigh scatter signal as might be measured by an OFDR system for a sensing fiber is depicted in the upper left graph with scatter amplitude plotted against delay time. Comparing the measured scatter pattern to a reference scatter pattern can produce a continuous measure of change in optical phase up to the end reflection of the sensing fiber, as depicted in the lower left graph. The derivative of this optical phase signal can be scaled to a measure of strain. However, if a local distortion exists due to an undesired signal bleeding into a measurement, as depicted the upper right graph, then a continuous measurement of phase cannot be produced, as depicted in the lower right graph. Hence, when a local distortion is present in the measurement, a continuous strain signal cannot be produced. Controlling or eliminating such distortions is desirable for technologies that require continuous measurements of strain along the length of the fiber, e.g., optical shape sensing.

A shape sensing system may include several, coordinated distributed strain sensing systems. Each distributed strain sensing system is connected to an independent optical core within a multi-core optical fiber. Each core is a waveguide. A non-limiting example of a multi-core optical fiber is shown in FIG. 2. The numerical dimensions shown in the Figure are just examples and are not limiting.

Because the waveguides corresponding to the independent cores within the multiple core shape sensing fiber are proximate to each other, cross-coupling between the sensing waveguides may occur. The likelihood of cross-coupling, or crosstalk, increases at locations where the optical fiber is physically modified, such as the case of an optical splice as depicted in FIG. 3. Light launched into a single core of the multi-core optical shape sensing fiber has the potential to scatter at discontinuities in fiber geometry as a result of the optical splice. There is a likelihood that light that scatters at this interface can couple into an adjacent core. This crosstalk produces signals that may be confused with or distort the intended measured signal.

Therefore, it would be desirable to provide a multiple channel interferometric system in which individual interferometric channel (an interferometric channel includes a measurement light path and a reference light path) measurements are not adversely affected by light from other channels. If possible, it would be useful to provide individual interferometric channel measurements that are essentially unresponsive to light from every other channel.

SUMMARY

An interferometric measurement system suppresses cross talk between optical waveguides used to measure one or more parameters. A first interferometric measurement channel coupled to a first waveguide, and a second interferometric measurement channel coupled to a second waveguide. At least one of the channels includes a reference light path in addition to the first and second waveguides. A reference path optical delay is associated with the reference light path, a first optical delay is associated with the input portion of at least one of the first and second interferometric measurement channels, and a second optical delay is associated with an output portion of the one interferometric measurement channel. A value of the first optical delay and a value the second optical delay are chosen to suppress crosstalk associated with the other of the first and second interferometric measurement channels in the one interferometric measurement channel over a predetermined length of the first waveguide. Signals corresponding to the reference light path and the first and second interferometric measurement channels are processed to measure one or more parameters.

In one example implementation, a sum of the first and second optical delay values may be the same as a value of the reference path optical delay.

In an example embodiment, processing circuitry is configured to suppress the crosstalk associated with the other of the first and second interferometric measurement channels in the one interferometric measurement channel over a predetermined length of the first waveguide based on the first and second optical delays.

In one example embodiment, both the first and the second interferometric measurement channels include a reference light path, and a light source is coupled to the reference light path and to the first and second interferometric measurement channels. A first optical detector is coupled to the one of the reference light path and the first interferometric measurement channel, and a second optical detector is coupled to the other reference light path and the second interferometric measurement channel. A third optical delay is associated with the input portion of the other of the first and second interferometric measurement channels, and a fourth optical delay is associated with an output portion of the other interferometric measurement channel. The first and third optical delays are different, and the second and fourth optical delays are different. Values of the first, second, third, and fourth optical delays are configured to suppress crosstalk associated with the other of the first and second interferometric measurement channels in the one interferometric measurement channel over a predetermined length of the first and second waveguides. The processing circuitry may be configured to suppress crosstalk between the first and second interferometric measurement channels over the predetermined length of the first and second waveguides based on the first, second, third, and fourth optical delays.

In an example implementation, a measurement light path includes an input portion coupled to a first end of the first waveguide to provide light from a light source to the first waveguide and an output portion coupled to a first end of the first waveguide to provide light reflected from the other end of the first waveguide to a first optical detector. A crosstalk light path includes an input portion coupled to a first end of a second waveguide to provide light from the light source to the second waveguide and a crosstalk portion that couples light from the other end of the second waveguide to the first waveguide.

In a preferred example embodiment, the crosstalk is shifted using the first and second optical delays to a time period sufficiently different from a measurement time period associated with the predetermined length of the one waveguide so that the processed signals are not affected by the crosstalk. The measurement time period associated with the predetermined length may be associated, for example, with a continuous strain measurement.

In one example implementation, Rayleigh scatter in the first and second waveguides is used to obtain the signals for processing. In another one example implementation, one or more Bragg gratings in the first and second waveguides are used to obtain the signals for processing.

In an example but non-limiting application, each of the optical waveguides corresponds to a core in a multi-core optical fiber. In that case, the cross coupling may be due to defects in a multi-core structure of the multi-core optical fiber. The one or more parameters may include a bend and/or a twist of a structure.

An example method is also described in an interferometric measurement system for suppressing cross talk between optical waveguides. The method includes:

coupling a first interferometric measurement channel to a first waveguide;

coupling a second interferometric measurement channel to a second waveguide, where at least one of the channels includes a reference light path in addition to the first and second waveguides and a reference path optical delay associated with the reference light path;

adding a first optical delay associated with the input portion of at least one of the first and second interferometric measurement channels;

adding a second optical delay to an output portion of the one interferometric measurement channel;

wherein a value of the first optical delay and a value the second optical delay are chosen to suppress crosstalk associated with the other of the first and second interferometric measurement channels in the one interferometric measurement channel over a predetermined length of the first waveguide, and processing by a computer signals corresponding to the reference light path and the first and second interferometric measurement channels to measure the one or more parameters.

Another example aspect of the technology includes a non-transitory, computer-readable storage medium for use in an interferometric measurement system having optical waveguides and including a first interferometric measurement channel coupled to a first waveguide, a second interferometric measurement channel coupled to a second waveguide, at least one of the channels including a reference light path in addition to the first and second waveguides, a first optical delay associated with the input portion of at least one of the first and second interferometric measurement channels and a second optical delay associated with an output portion of the one interferometric measurement channel. The non-transitory, computer-readable storage medium stores a computer program comprising instructions that cause a computer to process signals corresponding to the reference light path and the first and second interferometric measurement channels to measure one or more parameters and to suppress crosstalk associated with the other of the first and second interferometric measurement channels in the one interferometric measurement channel over a predetermined length of the first waveguide based on the first and second optical delays.

DETAILED DESCRIPTION

Figure 1:
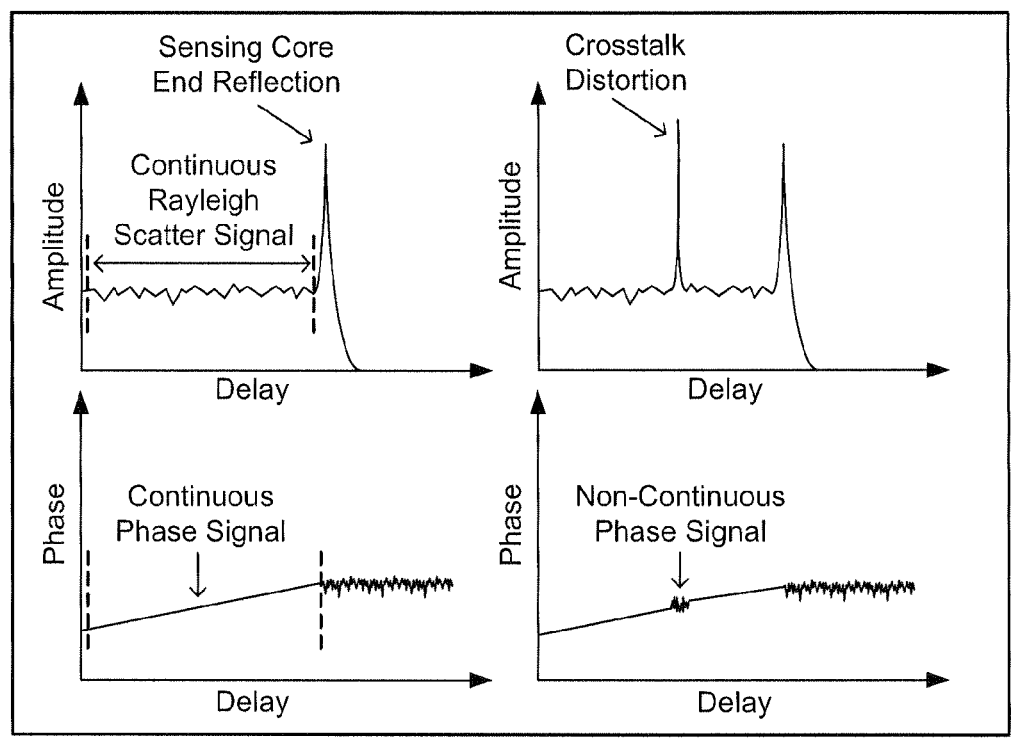
FIG. 1 shows graphs of examples of local distortions that disrupt the ability to continuously measure strain.
Figure 2:
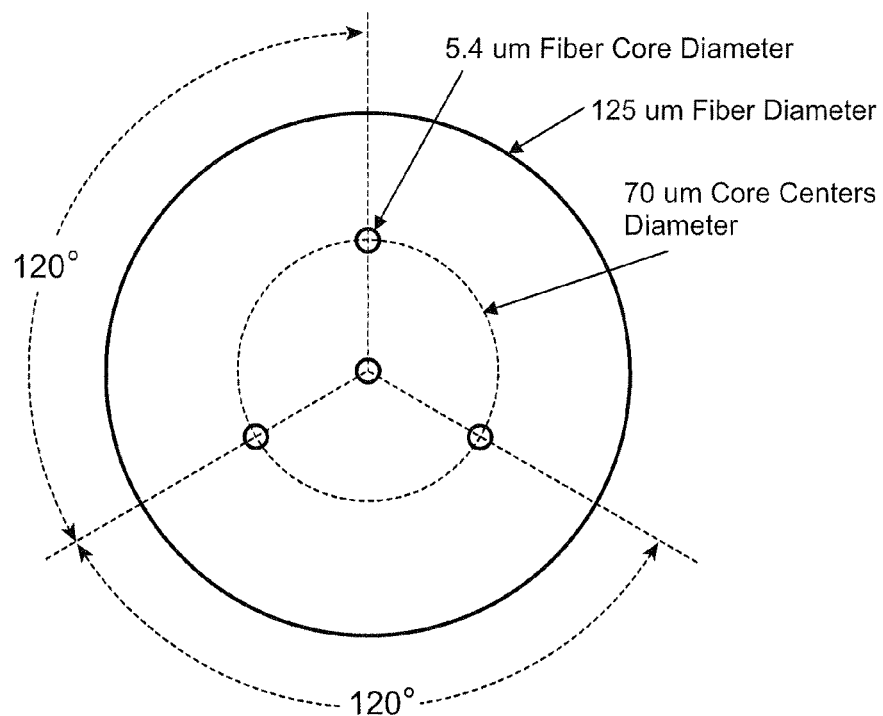
FIG. 2 is an example of a cross section of a multi-core optical fiber.
Figure 3:
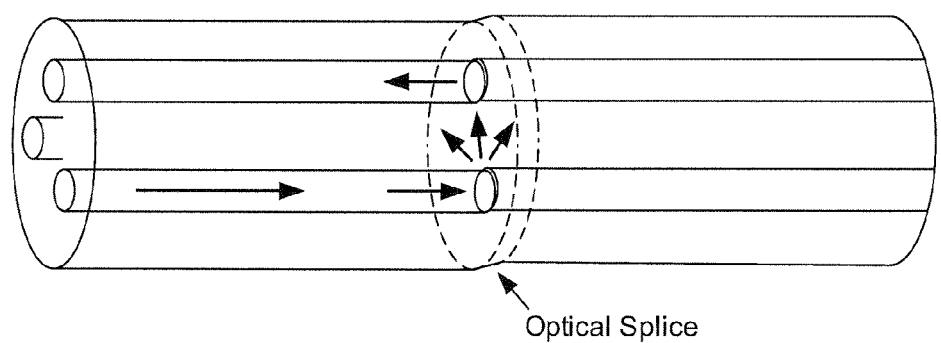
FIG. 3 is a diagram illustrating the concept of crosstalk between adjacent optical waveguides such as cores in a multi-core optical fiber.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 4:
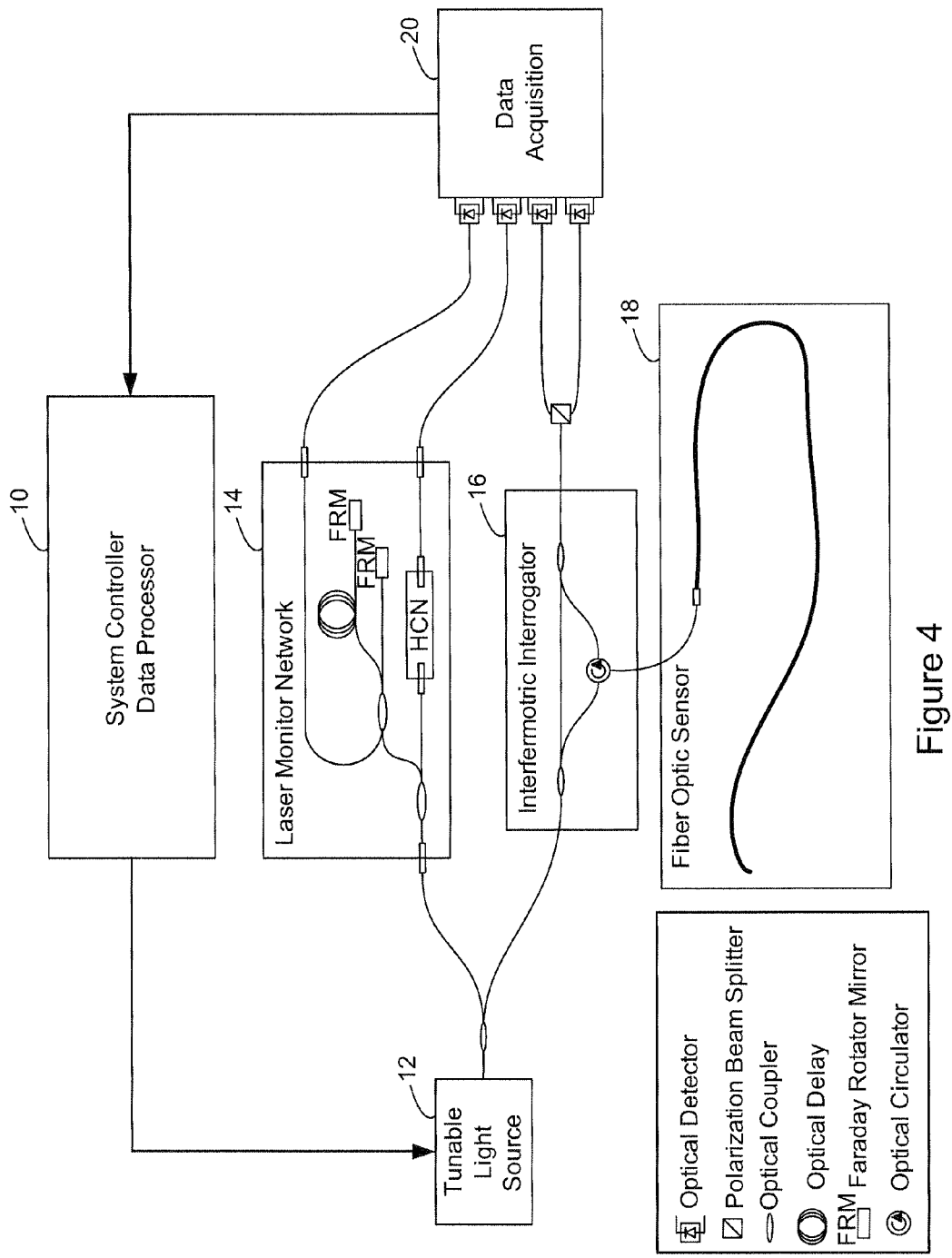
FIG. 4 is a non-limiting example of an OFDR-based distributed strain sensing system.

FIG. 4 illustrates a non-limiting example of an OFDR-based distributed strain sensing system. A system controller 10 initiates a tunable light source 12, e.g., a tunable laser, to scan through a range of optical frequencies. Light enters the sensing or measurement fiber 18 through a measurement arm or path of an interferometric interrogator 16 that includes an optical circulator coupling the measurement fiber 18 to an input optical coupler and output optical coupler. A reference path extends between the input optical coupler and output optical coupler. Light scattered from the sensing fiber interferes with light that has traveled through the reference path. A laser monitor network 14 provides an absolute wavelength reference throughout the measurement scan using a gas cell, e.g., a hydrogen cyanide (HCN) gas cell. The laser monitor network 14 uses an interferometer to measure tuning rate variations throughout the scan. Data acquisition electronic circuitry 20 includes optical detectors, e.g., photodiodes, to convert measured optical signals to electrical signals. The system controller data processor 10 resamples the interference pattern from the measurement fiber using the laser monitor 14 outputs, also converted to electrical signals by corresponding optical detectors, to ensure the data are sampled with a constant increment of optical frequency. This resampling is needed for the Fourier transform operation.

The system controller data processor 10 Fourier transforms the resampled sensing fiber signal to the temporal (time) domain and produces a signal of scatter amplitude verses delay along the measurement fiber length. Using the distance light travels in a given increment of time based on the known speed of light, the delay may be converted to a measure of length along the sensing fiber. Thereafter, the scatter signal depicts each scattering event as a function of distance along the fiber. The sampling period is referred to as the spatial resolution and is inversely proportional to the frequency range that the tunable light source is swept through during the measurement. As the fiber is strained, the local "scatters" shift as the fiber changes in physical length. It can be shown that these strain-induced distortions are highly repeatable.

An OFDR measurement is stored in memory that serves as a reference pattern of the fiber in an unstrained state. The system controller data processor 10 compares a subsequent OFDR measurement to this reference scatter pattern to determine a measure of shift in delay of the local scatters along the length of the sensing fiber. This shift in delay manifests as a continuous, slowly varying optical phase signal when compared against the reference scatter pattern. The derivative of this optical phase signal is directly proportional to change in physical length of the sensing fiber. Change in physical length may then be scaled by the system controller data processor 10 to strain producing a continuous measurement of strain along the sensing fiber.

Figure 5:
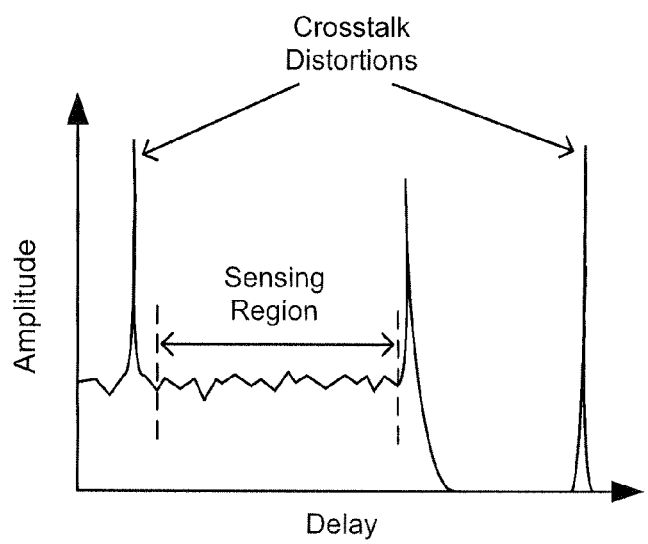
FIG. 5 is a diagram showing that crosstalk distortions can be shifted to delays outside of the sensing region without distorting the sensing region of interest.

To solve the crosstalk problem described in the background, the location of a crosstalk distortion in a given data set is controlled by modifying the interferometers within the multiple channel interferometric system using optical delays. In general, selective placement of optical delays in interferometric channels acts to move undesirable crosstalk responses to interferometer path delay differences outside the delay range of a given measurement region along the measurement waveguide. For example, the crosstalk interferometer delay differences may be such that they are greater than the physical length of the multi-core fiber, or the crosstalk interferometer delay differences may be shifted to a location lower in delay than the sensing region. See FIG. 5. The sensing region of interest is not distorted by crosstalk from other waveguides in the fiber.

Figure 6:
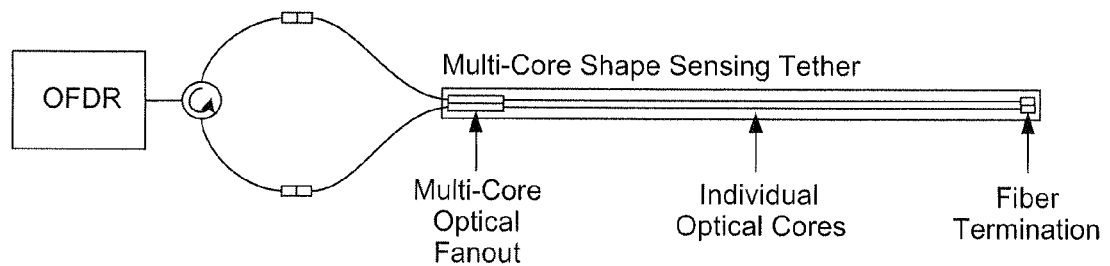
FIG. 6 shows an example test network used to measure cross coupling in a multi-core shape sensing tether.

An optical network may be used to identify locations where crosstalk occurs and to quantify the magnitude of crosstalk at these locations. An example of such an optical network based on an optical circulator is shown in FIG. 6. Two adjacent optical cores within the shape sensing fiber are connected to the OFDR via an optical circulator. The optical circulator preferably has sufficient isolation to ensure that during a measurement interrogator light from the OFDR is only launched into a single core. The circulator blocks any returning backscattered light so that only light coupling into an adjacent core within the shape sensing fiber will return to the OFDR.

Figure 7:
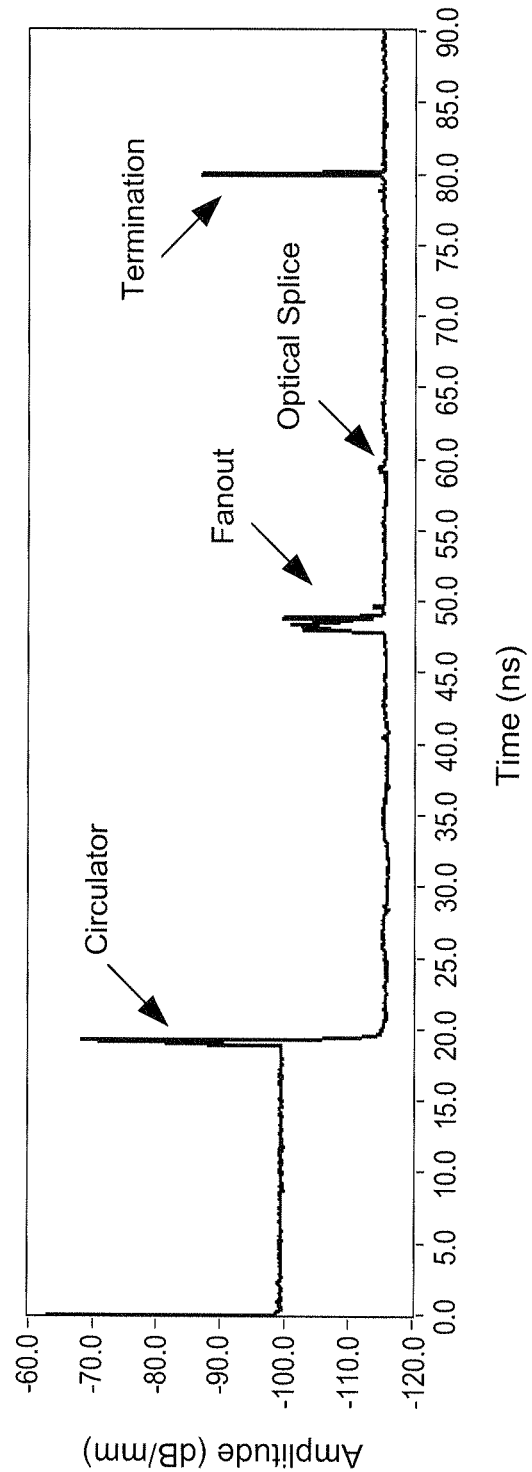
FIG. 7 is an graph showing an example OFDR measurement for the network in FIG. 6.

FIG. 7 is an amplitude v. time graph of the OFDR measurement produced by the described test setup in FIG. 6. As shown, the circulator prevents backscatter from the optical fiber from returning to the OFDR instrument as evidenced by a drop to OFDR instrument background levels at a delay of 20 ns. After this event, the measured signals are a result of light that has coupled into an adjacent core. Two distinct features with delays are shown that correspond to the multi-core optical fanout and the physical termination of the multi-core shape sensing fiber. A weaker signal is observed which corresponds to an optical splice in the tether assembly. These features may manifest as crosstalk thereby distorting the measurement signal of interest.

Figure 8:
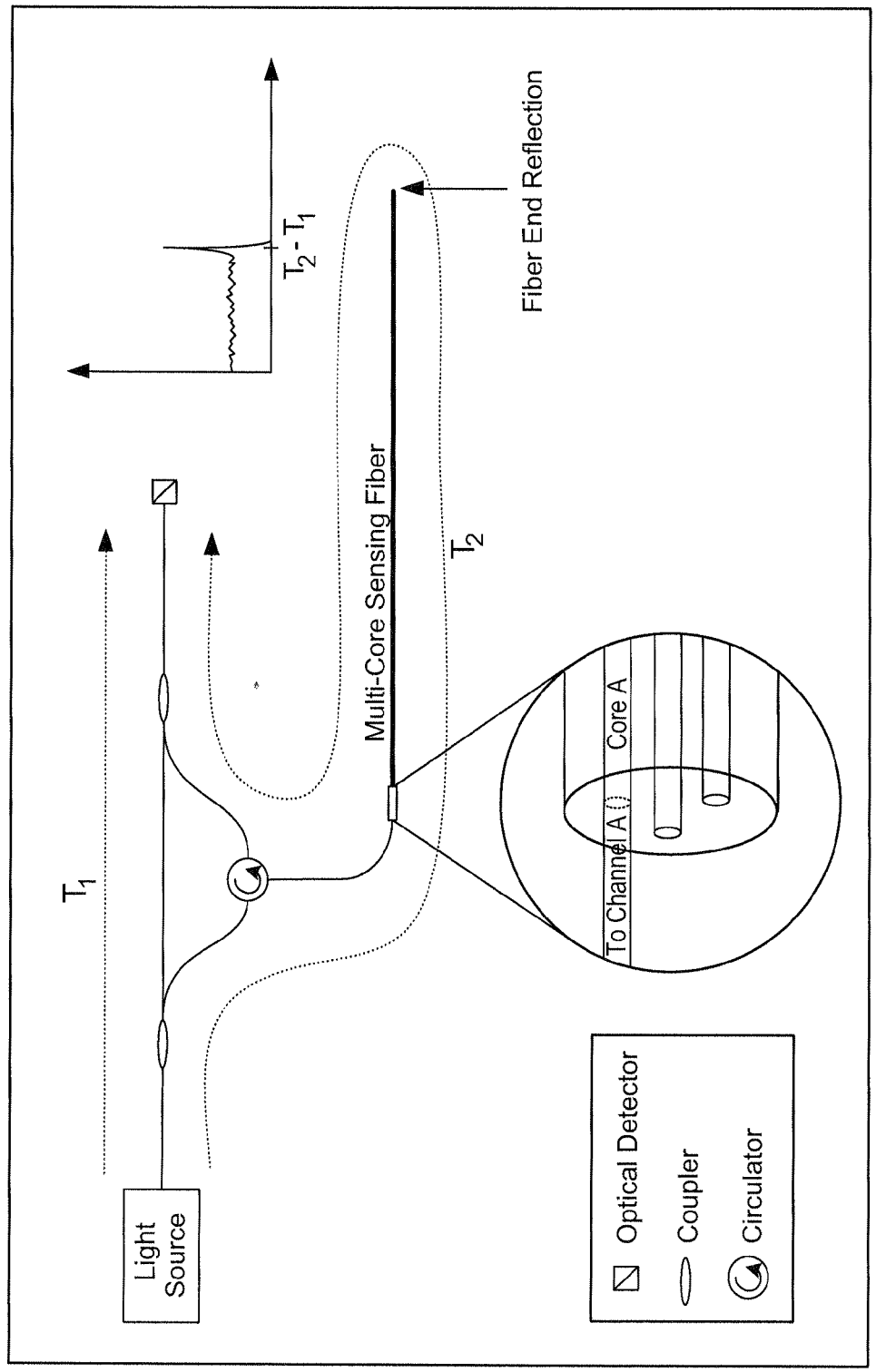
FIG. 8 is an example of a single channel OFDR network connected to a multi-core shape sensing fiber.
Figure 9:
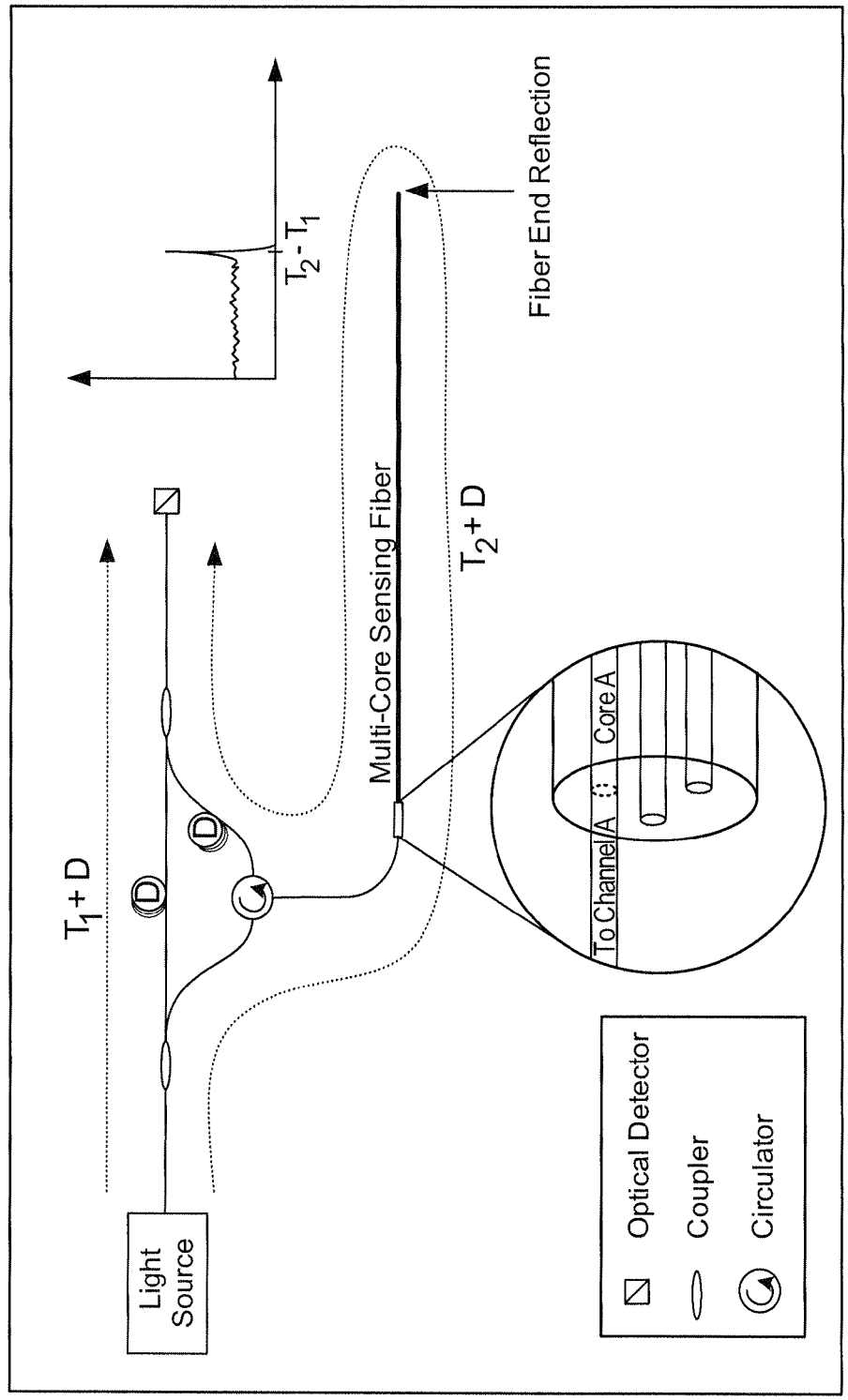
FIG. 9 is an example where optical delays are added to a single channel OFDR system in a manner that the measurement is not changed.

During an OFDR measurement, light passes through the two arms of an interferometer—reference path and measurement path—and experiences two different optical delays based on the respective optical path length. The frequency of the interference fringe pattern observed at an optical detector is a function of the difference between these two optical delays. FIG. 8 is a simplified drawing of an example of an optical network connected to a multi-core optical sensing fiber, e.g., a shape sensing fiber. The end reflection of the multi-core sensing fiber is observed at a delay equal to the difference between the measurement path ($T_2$) and the reference path ($T_1$). By controlling the delays within an interferometer, the delay at which an event is perceived by an OFDR system may be controlled. Optical delays may be added to an optical network without changing the measurement. One example of an optical delay is a delay "spools" of extra fiber, but other types of optical delay may be used. FIG. 9 shows the addition of two delay spools "D" at selective locations in the optical network in a single channel OFDR system.

As explained, the end reflection of the multicore sensing fiber is measured at a delay determined from the difference between the reference and measurement paths of the interferometer. Since the optical delays D are placed in both the reference and measurement arms of the interferometer, the end reflection of the fiber is measured at the same delay $[(T_2+D)-(T_1+D)=T_2-T_1]$ as in FIG. 9. In other words, the addition of these optical delays does not change the measurement.

Figure 10:
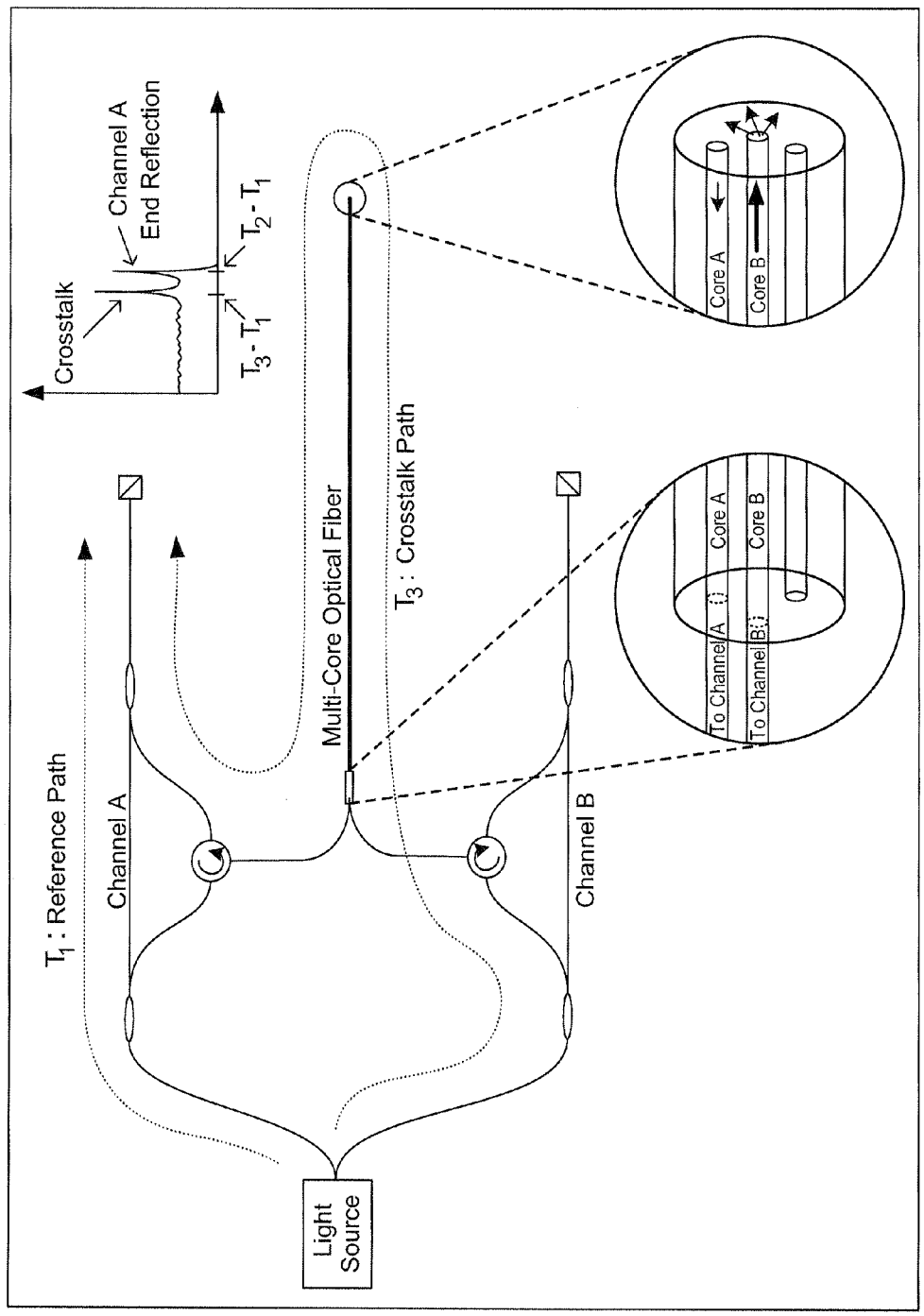
FIG. 10 is an example showing a second channel connected to the multi-core optical fiber that has the potential to produce a crosstalk signal in the measurement of Channel A.
Figure 11:
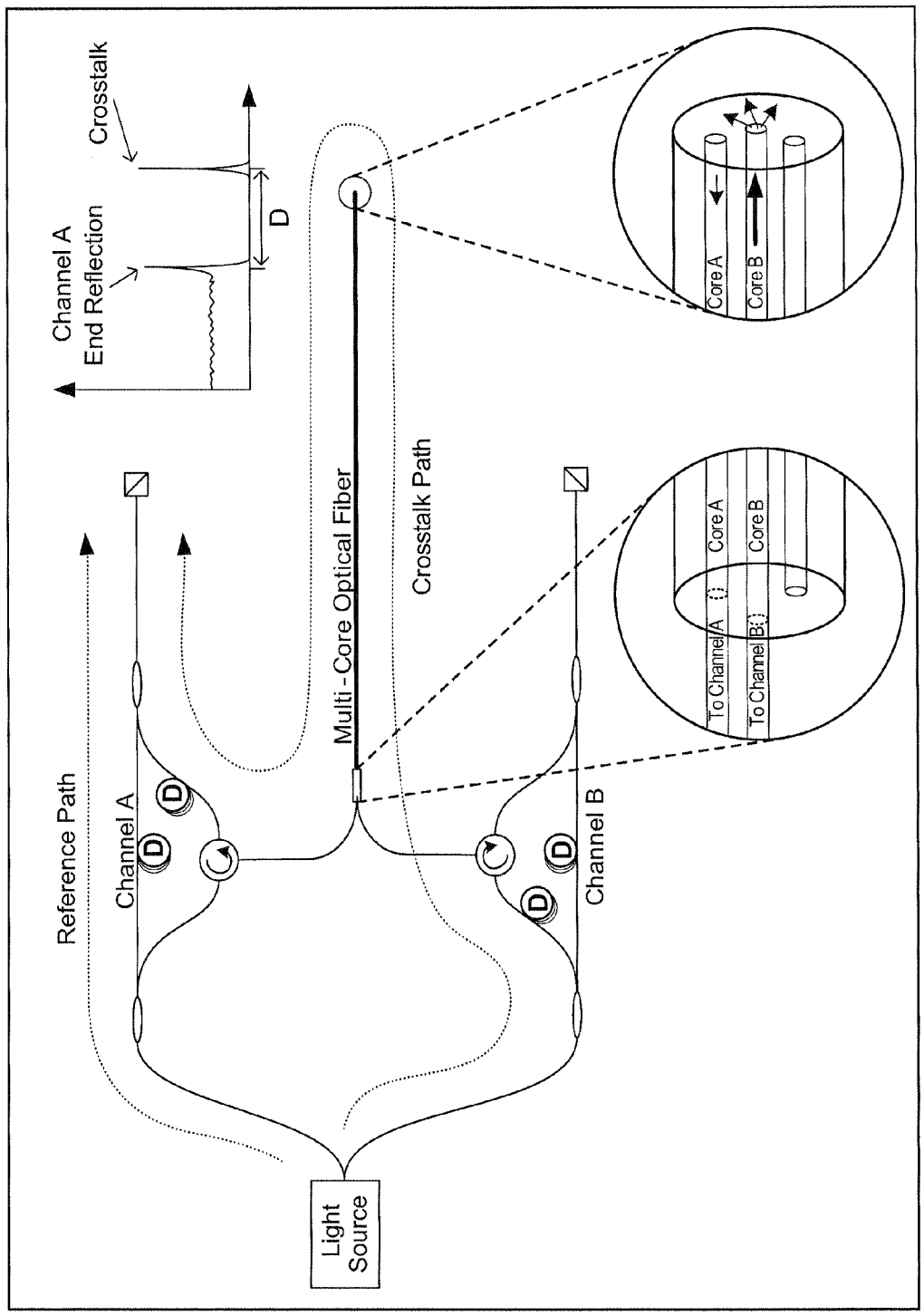
FIG. 11 is an example showing optical delays being added to the interferometer arms that will displace crosstalk to a higher delay.

But selective implementation of these delays may be used to control the delay of crosstalk within the multi-core optical fiber. A second interferometric measurement channel B is added to the system (in addition to interferometric measurement channel A) and connected to a separate optical core within the multi-core sensing fiber as shown in FIG. 10. As light from a light source is launched into the second interferometric measurement channel B, a probability exists that light at the end of the fiber will be couple into an adjacent core associated with interferometric measurement channel A as illustrated by crosstalk path $T_3$. During the manufacturing process, subtle length differences accumulate between the two interferometric measurement channels. As a result, coupled light may be perceived at a lower delay distorting the measurement of interferometric measurement channel A. The possibility that this distortion corrupts a measurement can be eliminated by the addition of optical delays. As shown in the example of FIG. 9, optical delays may be added to an interferometric measurement channel without modifying the measurement. FIG. 11 shows an example of how optical delays added in particular portions of the interferometric measurement channels may be used to delay crosstalk events. Due to the strategic positioning of the optical delays in the example optical network depicted in FIG. 11, the crosstalk light experiences a delay greater than that of the measurement path of interferometric measurement channel A. Hence, the light is observed at a much higher delay as perceived by the OFDR system ensuring that the measurement is not distorted by the crosstalk signal.

Figure 12:
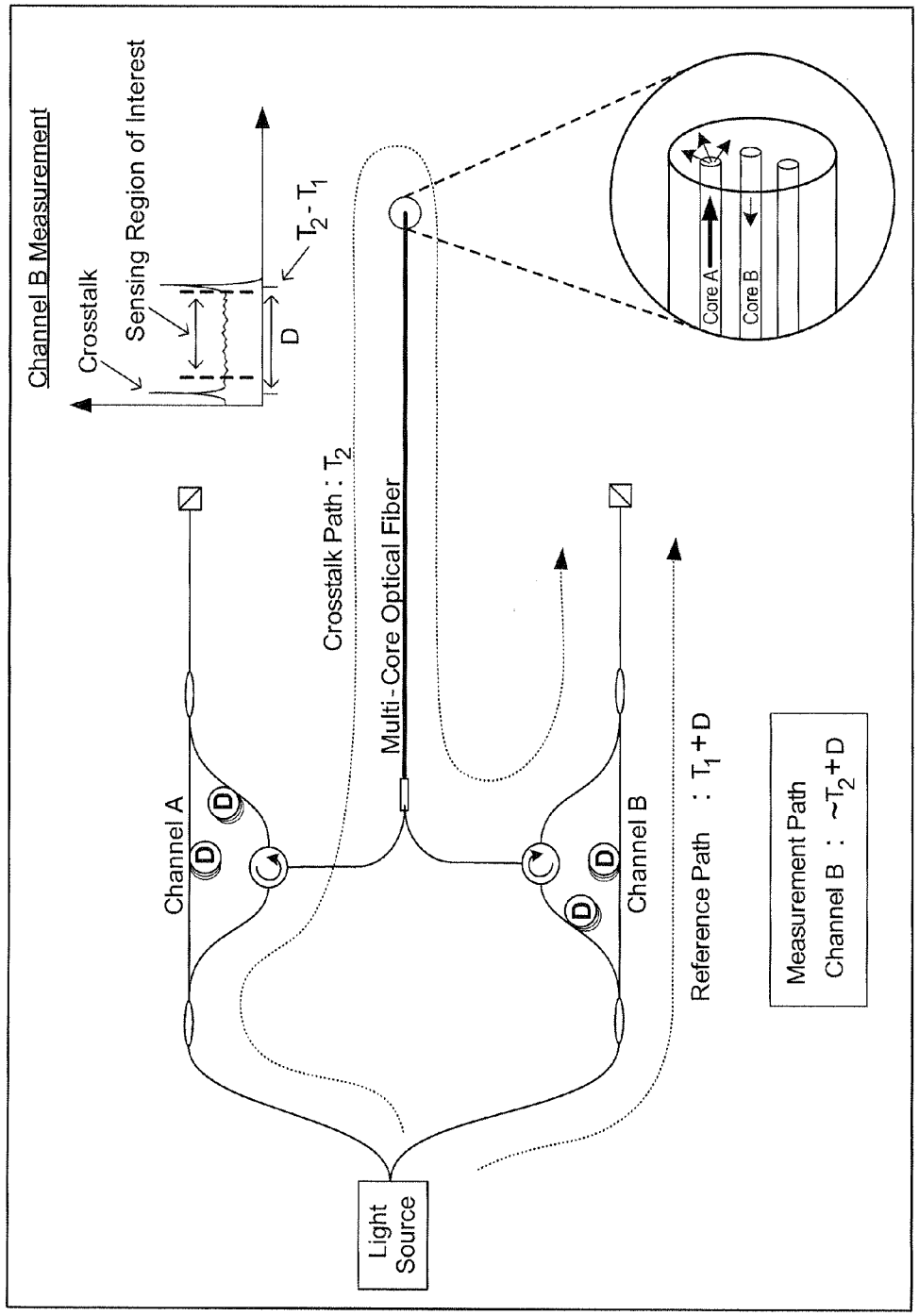
FIG. 12 shows a non-limiting, example network depicting how optical delays can be utilized to displace crosstalk terms.

The example in FIG. 11 shows how interferometric measurement channel B will be the source for crosstalk in interferometric measurement channel A. In addition, FIG. 12 depicts an example of crosstalk induced on interferometric measurement channel B as a result of the measurement of interferometric measurement channel A. Light launched into core A during the measurement of interferometric measurement channel A has the potential to couple into core B. Comparing the crosstalk path ($T_2$) to the reference path ($T_1+D$) provides a delay that is ($-D$) from the end reflection ($T_2-T_1$) of core B in the interferometric measurement channel B measurement. This negative delay can distort the Rayleigh scatter signature of this measurement because it has been shifted to a delay that is not beyond the physical end of the fiber. However, the delay (D) may be chosen such that the resulting time shift of the crosstalk term falls at a delay before the sensing region of interest. Crosstalk terms may be shifted to a delay either before or after the sensing region of interest thereby providing considerable flexibility when designing optical networks.

Figure 13:
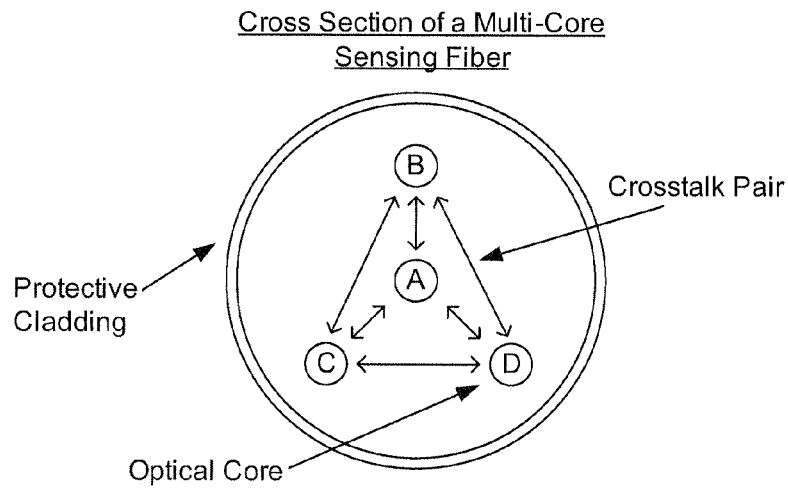
FIG. 13 shows possible crosstalk terms for a cross section of a four core multi-core fiber.

As higher numbers of interferometric interrogators are added to a given sensing system, more permutations for crosstalk arise. In the two interrogator example, only two cross talk terms arise: ChA–ChB and ChB–ChA. Consider the case where four interferometic interrogators are connected to four independent cores within a multi-core sensing fiber. Twelve crosstalk terms for a single crosstalk location, such as the termination of the multi-core fiber, are possible as illustrated in FIG. 13.

Figure 14:
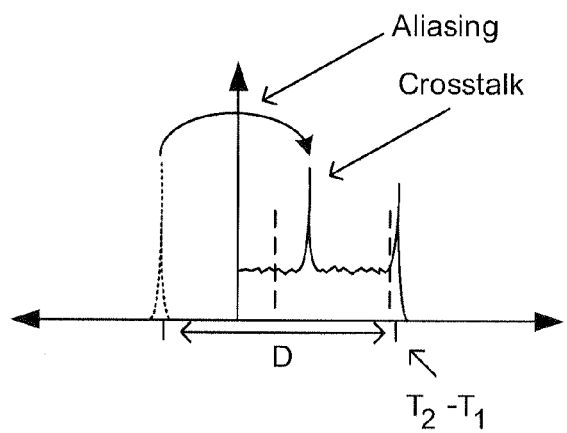
FIG. 14 shows an example wherein shifting crosstalk terms to negative delays alias back into positive delays in the measurement.

Selecting delay values that shift crosstalk terms to negative delays should be done with care. Reconsider FIG. 12 but assume that the delay (D) is much greater than the delay of the end reflection of core B ($T_2-T_1$) as illustrated in FIG. 14. In this scenario, the crosstalk distortion is shifted to a negative delay as seen by the interferometric interrogator. By the nature of an OFDR measurement, this negatively-delayed, crosstalk distortion will alias into the desired measurement because it is reflected about zero delay. Thus, it is preferred to choose delays in an optical crosstalk compensating network so that delayed, crosstalk distortions do not alias into the measurement region of interest.

Figure 15:
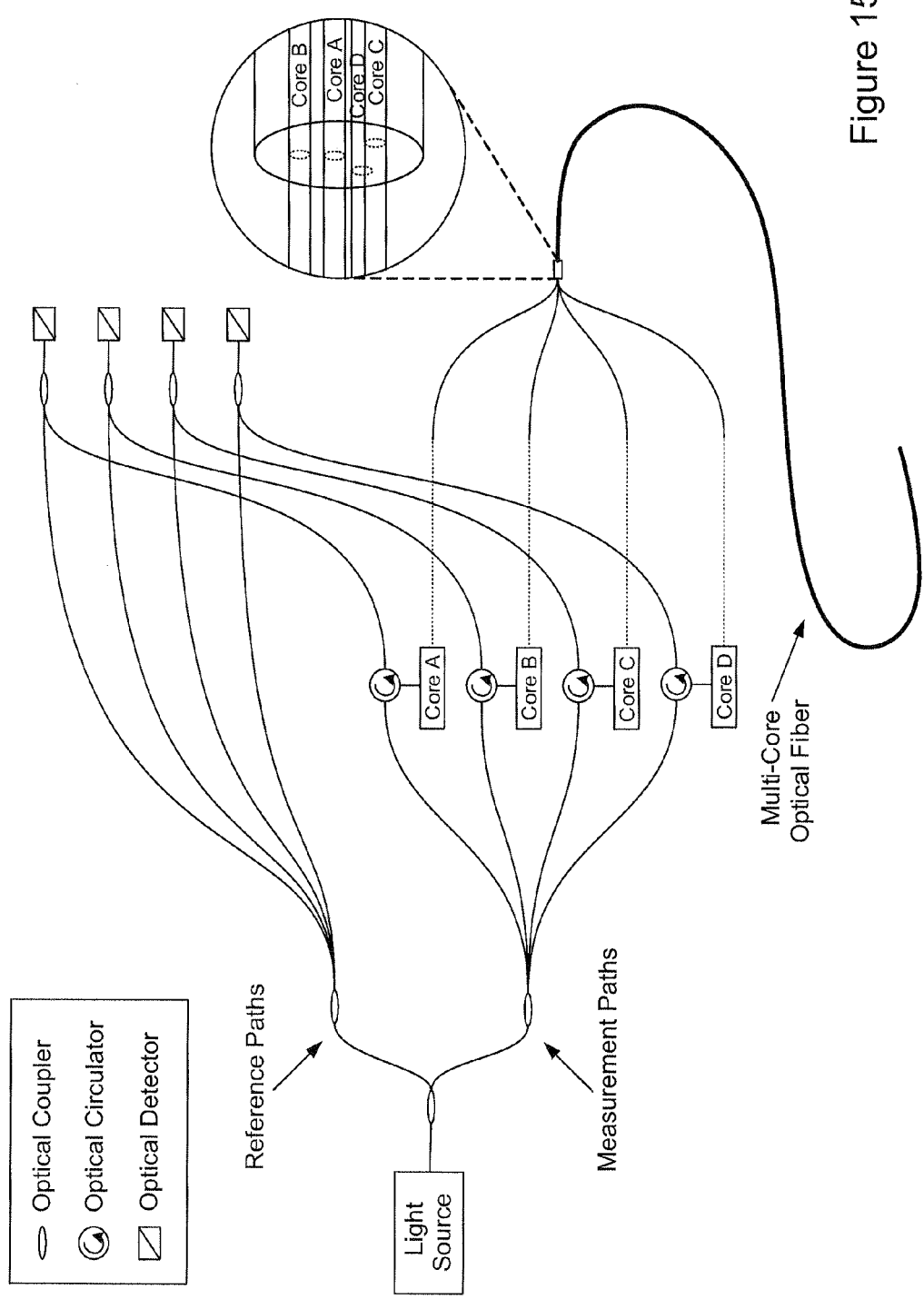
FIG. 15 is a non-limiting example of an optical network for an optical sensing system using a multi-core fiber.
Figure 16:
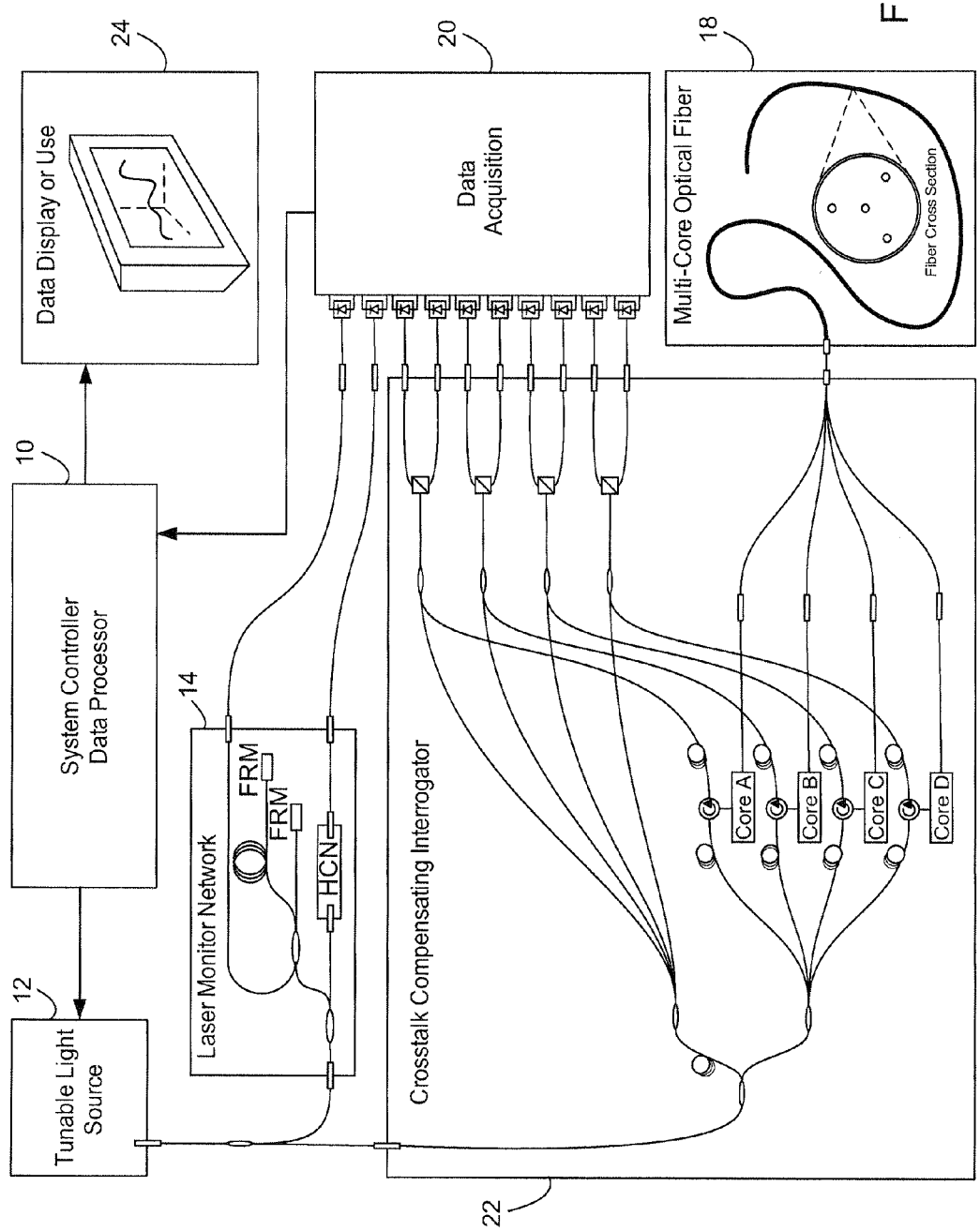
FIG. 16 is non-limiting example of an OFDR-based optical sensing system using a multi-core fiber system with crosstalk compensation.

FIG. 15 is a non-limiting example of an optical network for an optical sensing system using a multi-core fiber. One non-limiting example application is for shape sensing. Shape sensing may be defined for this non-limiting example illustration as the measurement of a three dimensional position of a length of optical fiber at both a high resolution (e.g., <50 micron) and a high accuracy (e.g., <1% fiber length). The strain profiles of multiple optical cores within the shape sensing fiber are independently and simultaneously measured. Strain at a given distance along the length of a core is measured by monitoring a change in optical phase using Optical Frequency Domain Reflectometry (OFDR). The optical network of a shape sensing system is designed such that a single laser sweep can be used to simultaneously interrogate multiple independent optical cores within the shape sensing fiber. FIG. 16 is non-limiting example of an OFDR-based optical sensing system using a multi-core fiber system with crosstalk compensation. The OFDR elements from FIG. 4 are similar with the addition of a data display or data use block 24 and a crosstalk compensating interrogator 22 described below.

Scanned laser light from the tunable laser source 12 is directed to four independent OFDR networks via the use of optical couplers. The laser light is first split and directed to two separate sets of paths: a set of reference paths and a set of measurement paths optically connected to respective independent cores within the sensing fiber. The configuration differs somewhat from the two channel example above where the light from the source was first split into two paths and then split into a reference path and measurement path for each interferometric channel. The order of operations of the splitting of the source light does not change the nature of the measurement of the given channels, and the network depicted in FIGS. 15 and 16 is still a four channel interferometric system. However, splitting the light into two sets of paths initially offers the advantage that a single reference optical delay can be inserted into the network before the light is split to the individual reference paths for the interferometric channels simplifying the optical network.

Although simultaneous interrogation of the optical cores within a shape sensing fiber is not required to reconstruct the shape of the shape sensing fiber, this particular implementation offers several advantages. First, a simultaneous measurement of the optical cores ensures a wavelength shift does not exist between the individual cores. Even sophisticated lasers are limited to wavelength repeatability on the order of picometers. Without a matching of start wavelength between the cores, even picometer shifts will result in errors during the reconstruction of shape. Second, a simultaneous measurement of all optical cores ensures that the fiber has not physically changed shape between measurements of the cores. This allows for a dynamic measurement and for a higher update rate output from the shape sensing system. Third, this implementation simplifies the design of the optical system, e.g., a single laser may be used and optical switches are not required, both of which reduce manufacturing costs and complexity.

The simultaneous measurement of the different optical cores produces a likelihood of crosstalk distortions. Consider the physical termination of the sensing fiber. The end faces of the optical cores are relatively strong reflectors as compared to the backscattered light of the multi-core optical fiber. A termination may be constructed in such a way that the optical cores transition into absorptive material, greatly attenuating the reflection at this interface. However, due to the proximity of the optical cores (~30 microns), unguided light may couple into adjacent cores even in the presence of high attenuating agents. Due to manufacturing variations during the construction of an optical sensing network, each of the measurement paths has a similar but unique length. As described for the previous example, these length variations create the possibility that crosstalk will distort a measurement. An example of a distorted shape sensing measurement of a single core as a result of crosstalk from adjacent optical cores is depicted in the graph FIG. 17.

Figure 17:
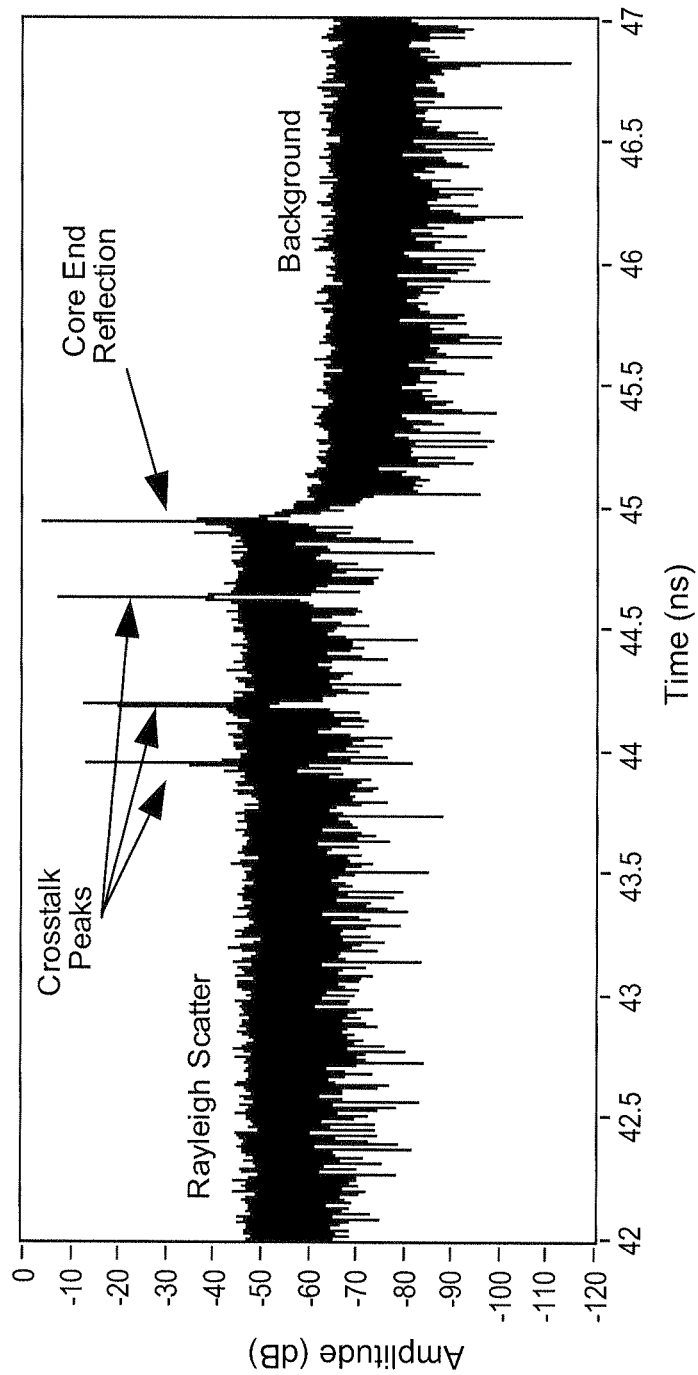
FIG. 17 is an example of an OFDR scan of a single core distorted by discrete peaks as a result of crosstalk from adjacent optical cores.

The physical end of the measured optical core is determined by a drop in signal from the level of Rayleigh scatter to the instrument's background level. In FIG. 17, this occurs at a delay of ~45 ns. Discrete peaks are observed before the end reflection of this optical core that distort the strain measurement at these locations. In an example shape sensing application, the distorted strain measurements produce errors in the reconstruction of shape. In any application in which it is desired to continuously measure a signal up to the physical end of the multi-core optical fiber, this imposes a significant hindrance to the measurement system.

It is desirable to construct an optical network such that the delay corresponding to the end reflection of an optical core is nearly the same across all OFDR data acquisition channels. This matching simplifies the OFDR detector electronics and data processing. When using delays to displace crosstalk distortions, this can be achieved by staggering delays within the measurement interferometer arms throughout the optical network. In essence, the legs of the measurement path may have any value such that the resulting difference with the reference path produces the same value across all acquisition channels. Further, this optical delay staggering also facilitates the displacement of crosstalk terms to a delay either beyond or before the sensing region of interest. An example and non-limiting embodiment of an optical network designed to displace or shift the crosstalk distortions produced from a four channel OFDR network is depicted in FIG. 18.

Figure 18:
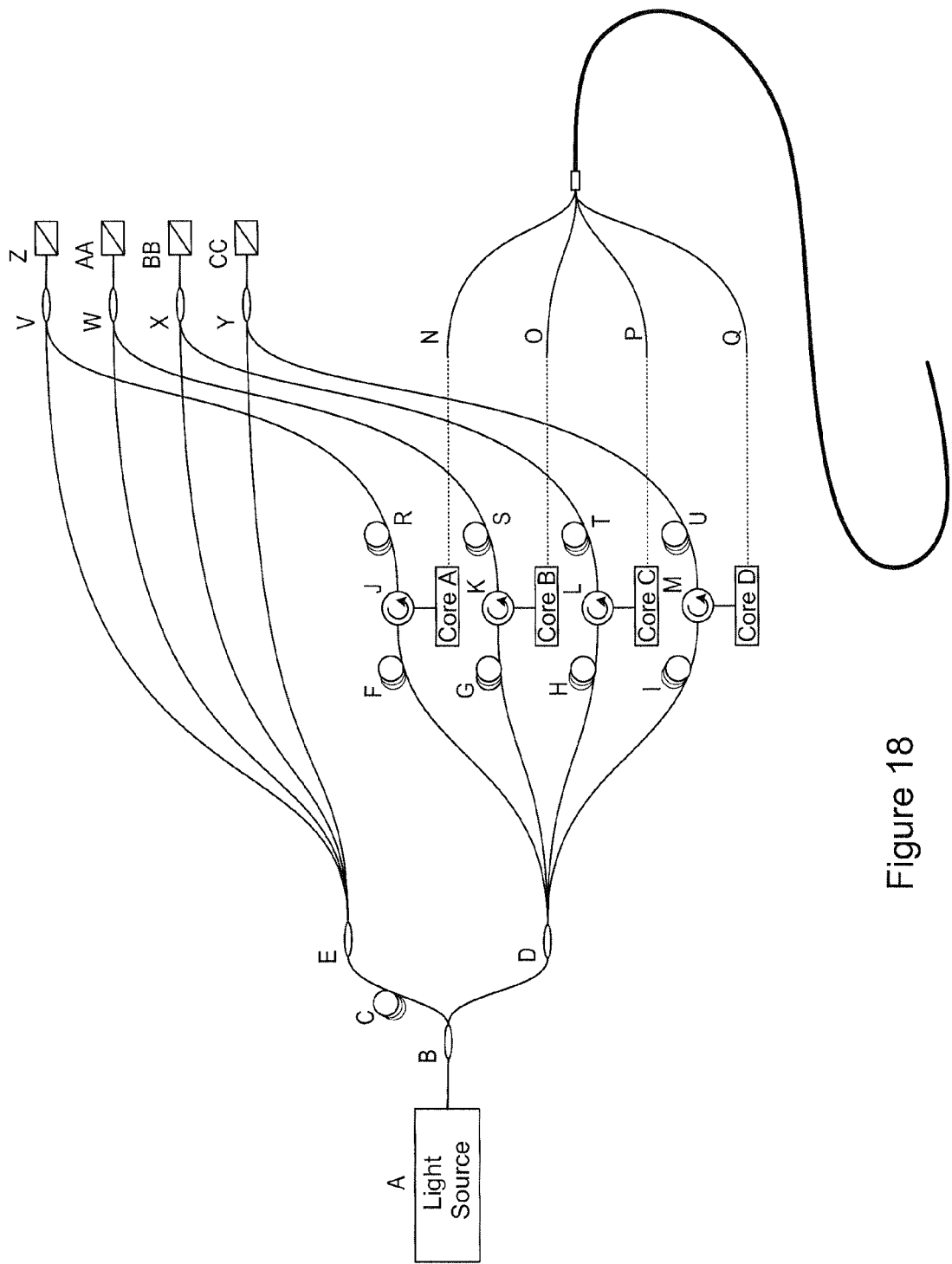
FIG. 18 is an example of OFDR-based optical sensing system using a multi-core fiber system having non-limiting examples of added optical delays used for crosstalk compensation.
Figure 19:
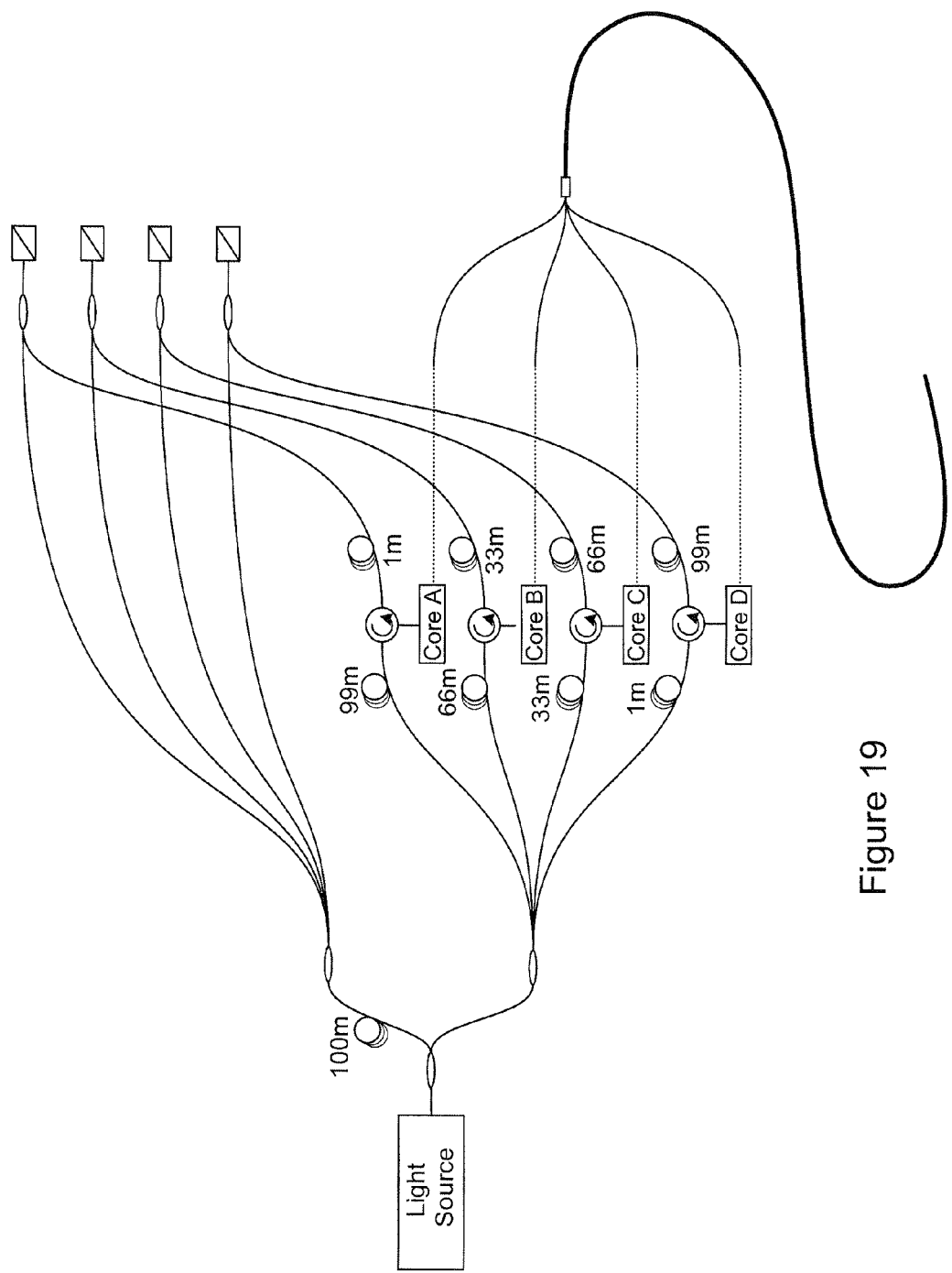
FIG. 19 shows the example OFDR-based optical sensing system from FIG. 18 with non-limiting, example, staggered delay values.

In FIG. 18, a tunable laser source (A) emits light with a wavelength that changes with time. The laser light is split into two separate optical paths by an optical coupler (B). The first path provides the reference paths for the multiple interferometers within the optical sensing system. The first path is delayed by a reference delay (C). After traveling through the delay (C), the light is split by an optical coupler (E) to four separate reference arm paths. The second path from optical coupler (B) is split by an optical coupler (D) to four separate measurement or interrogator paths. Each interrogator path includes an input measurement arm delay spool (F, G, H, I), each with a unique length. Each interrogator path includes an optical circulator (J, K, L, M) after the input measurement arm delay spool. Each interrogator path is attached to an independent optical core in the sensing fiber via a multi-core optical fanout (N, O, P, Q). Backscatter from an optical core within the sensing fiber returns through the circulator and is delayed by an output measurement arm delay (R,S,T,U), each delay with a unique delay time, e.g., length if the delay is implemented with a delay spool. The lengths of the input and output delays are chosen such that $F+R \approx G+S \approx H+T \approx I+U$. Light from each interrogator path is combined with light that traveled through the reference path light via a respective optical coupler (V,W,X,Y). Interference fringes from each measurement are detected by a corresponding optical detector (Z, AA, BB, CC) and recorded. In an example embodiment, the optical detectors are preferably polarization diverse. This implementation is depicted in FIG. 19 with non-limiting example delay values that might be used for an example embodiment of a shape sensing system.

Figure 20:
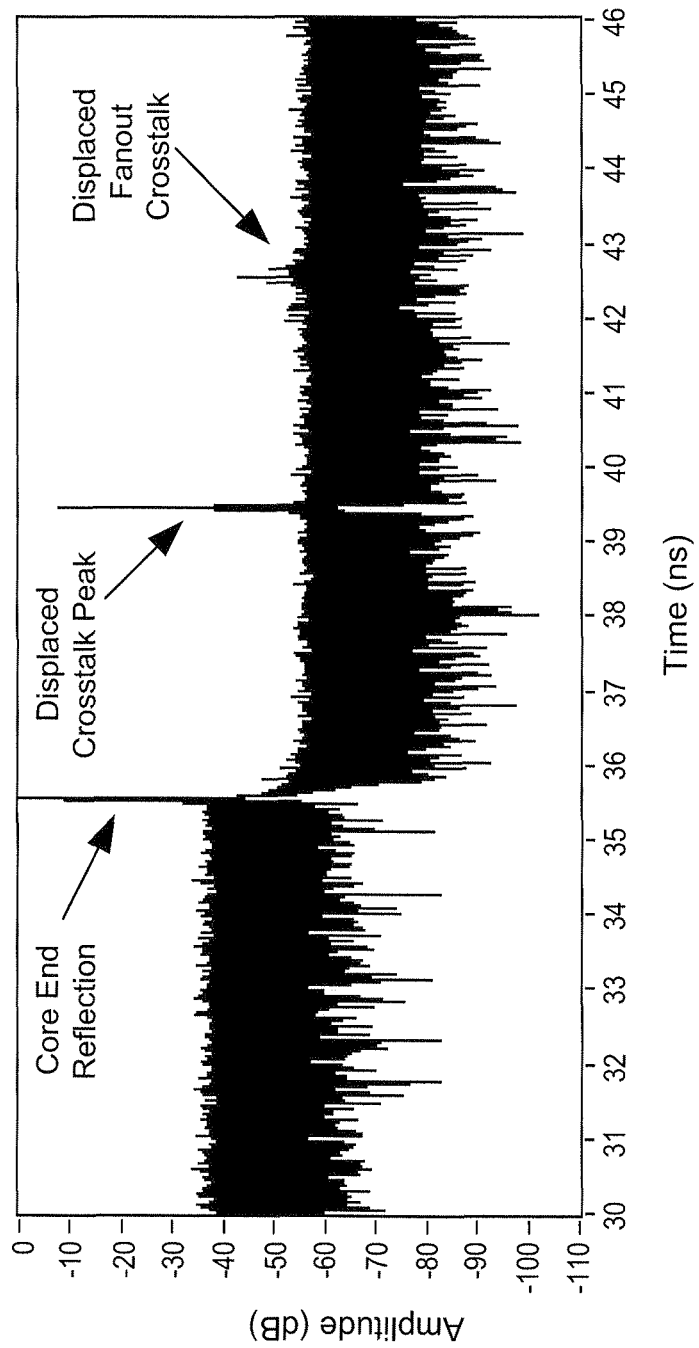
FIG. 20 is a graph showing an example OFDR measurement for the network in FIG. 19.

The choosing of delay values may be performed using any suitable process, but is preferably done so that all crosstalk terms are shifted beyond or before the measurement region of interest. A measurement of an example optical core is shown in FIG. 20 with a system designed with the optical network depicted in FIG. 19. As shown FIG. 20, the crosstalk peaks are shifted to a later time (i.e., higher frequency) then the physical end of the shape sensing fiber.

Although the examples above are directed to multi-core fibers, the technology also may be applied to other structures, e.g., optical waveguides in an optical chip, free-space optical beams probing the same object, etc. Although the OFDR measurement is described in terms of Rayleigh scatter, Bragg gratings may also be used.

The crosstalk suppression technology described above offers multiple advantages for fiber optic sensing. Deleterious effects of crosstalk on a given measurement occur near the physical end of a sensing fiber due to subtle variations in length during the construction of the interferometric channels in the sensing system. In many applications, it is desired to have the ability to measure one or more parameters along a length of sensing fiber up to the physical end of the sensing fiber. The crosstalk suppression provided by this technology allows the recovery of the entire physical length of the sensor. Crosstalk suppression in a multi-core sensing fiber, for example, can also be achieved by independently measuring the optical cores at different periods in time. For many applications, it is desired to have a simultaneous measurement of all optical cores within a sensing fiber. A simultaneous measurement creates crosstalk distortions that can be suppressed with the described network design. Further, a crosstalk suppressing network enables the use of a single light source routed to several independent waveguides which greatly reduces the cost and complexity of a multicore sensing system by eliminating the need for multiple light sources and/or optical switches. Lastly, a crosstalk suppressing network enables waveguides to be placed in closer proximity providing flexibility during the design of multi-waveguide structures.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An interferometric measurement system for suppressing cross talk between optical waveguides, comprising:
  a first interferometric measurement channel coupled to a first waveguide;
  a second interferometric measurement channel coupled to a second waveguide;
  at least one of the channels including a reference light path in addition to the first and second waveguides;
  a first optical delay of one of an input portion and an output portion of at least one of the first and second interferometric measurement channels and a second optical delay of the other of the input portion and the output portion of the other interferometric measurement channel,
  a value of the first optical delay and a value of the second optical delay chosen to suppress crosstalk associated with the other of the first and second interferometric measurement channels in the one interferometric measurement channel over a predetermined length of the first waveguide; and
  processing circuitry configured to process signals corresponding to the reference light path and the first and second interferometric measurement channels to measure one or more parameters,
  wherein the processing circuitry is configured to use the first and second optical delays to shift the crosstalk to a time period sufficiently different from a measurement time period associated with the predetermined length.

2. The apparatus in claim 1, further comprising:
  a reference path optical delay associated with the reference light path.

3. The apparatus in claim 2, wherein a sum of the first and second optical delay values is the same as a value of the reference path optical delay.

4. The apparatus in claim 1, wherein the processing circuitry is configured to suppress the crosstalk associated with the other of the first and second interferometric measurement channels in the one interferometric measurement channel over the predetermined length of the first waveguide based on the first and second optical delays.

5. The apparatus in claim 1, wherein the first and the second interferometric measurement channels include a first reference light path and a second reference light path, respectively, the apparatus further comprising:
  a light source coupled to the first and second reference light paths and to the first and second interferometric measurement channels;
  a first optical detector coupled to the first reference light path and the first interferometric measurement channel;
  a second optical detector coupled to the second reference light path and the second interferometric measurement channel; and
  a third optical delay associated with one of the input portion and the output portion of the other of the first and second interferometric measurement channels and a fourth optical delay associated with one of the input portion and the output portion of the one interferometric measurement channel,
  wherein the first and third optical delays are different and the second and fourth optical delays are different, and
  wherein values of the first, second, third, and fourth optical delays are configured to suppress crosstalk associated with the other of the first and second interferometric measurement channels in the one interferometric measurement channel over a predetermined length of the first and second waveguides.

6. The apparatus in claim 5, wherein the processing circuitry is configured to suppress crosstalk between the first and second interferometric measurement channels over the predetermined length of the first and second waveguides based on the first, second, third, and fourth optical delays.

7. The apparatus in claim 5, wherein the optical light source is a tunable laser.

8. The apparatus in claim 1, further comprising:
  a light source coupled to the reference light path and to the first and second interferometric measurement channels, and
  a first optical detector,
  wherein a measurement light path includes an input portion coupled to a first end of the first waveguide to provide light from the light source to the first waveguide and an output portion coupled to a first end of the first waveguide to provide light reflected from the other end of the first waveguide to the first optical detector, and
  wherein a crosstalk light path includes an input portion coupled to a first end of a second waveguide to provide light from the light source to the second waveguide and a crosstalk portion that couples light from the other end of the second waveguide to the first waveguide.

9. The apparatus in claim 1, wherein the measurement time period associated with the predetermined length is associated with a continuous strain measurement.

10. The apparatus in claim 1, wherein the processing circuitry is configured to use Rayleigh scatter in the first and second waveguides to obtain the signals for processing.

11. The apparatus in claim 1, wherein the processing circuitry is configured to use one or more Bragg gratings in the first and second waveguides to obtain the signals for processing.

12. The apparatus in claim 1, wherein each of the optical waveguides corresponds to a core in a multi-core optical fiber, and wherein the cross coupling is due to defects in a multi-core structure of the multi-core optical fiber.

13. The apparatus in claim 1, wherein the one or more parameters includes bend of a structure.

14. The apparatus in claim 1, wherein the one or more parameters includes twist of a structure.

15. The apparatus in claim 1, wherein the first interferometric measurement channel includes a first input portion and a first output portion and the second interferometric measurement channel includes a second input portion and a second output portion, and wherein the first, second, third, and fourth portions are different.

16. The apparatus in claim 1, wherein the first interferometric measurement channel is part of a first optical frequency domain reflectometry (OFDR) system and the second interferometric measurement channel is part of a second OFDR system that is different than the first OFDR system.

17. A method in an interferometric measurement system for suppressing cross talk between optical waveguides, comprising:
    coupling a first interferometric measurement channel to a first waveguide;
    coupling a second interferometric measurement channel to a second waveguide, where at least one of the channels includes a reference light path in addition to the first and second waveguides and a reference path optical delay associated with the reference light path;
    adding a first optical delay associated with one of an input portion and an output portion of at least one of the first and second interferometric measurement channels;
    adding a second optical delay to the other of the input portion and the output portion of the other of the first and second interferometric measurement channels;
    wherein a value of the first optical delay and a value of the second optical delay are chosen to suppress crosstalk associated with the other of the first and second interferometric measurement channels in the one interferometric measurement channel over a predetermined length of the first waveguide,
    shifting the crosstalk using the first and second optical delays to a time period sufficiently different from a measurement time period associated with the predetermined length; and
    processing by a computer signals corresponding to the reference light path and the first and second interferometric measurement channels to measure one or more parameters.

18. The method in claim 17, further comprising adding a reference path optical delay associated with the reference light path, wherein a sum of the first and second optical delay values is the same as a value of the reference path optical delay.

19. The method in claim 17, further comprising processing by the computer the signals to suppress the crosstalk associated with the other of the first and second interferometric measurement channels in the one interferometric measurement channel over the predetermined length of the first waveguide based on the first and second optical delays.

20. The method in claim 17, wherein the first and the second interferometric measurement channels include a first reference light path and a second reference light path, respectively, the method further comprising:
    coupling a light source to the first and second reference light paths and to the first and second interferometric measurement channels;
    coupling a first optical detector to the first reference light path and the first interferometric measurement channel;
    coupling a second optical detector to the second reference light path and the second interferometric measurement channel; and
    adding a third optical delay to one of the input portion and the output portion of the other of the first and second interferometric measurement channels and a fourth optical delay to one of the input portion and the output portion of the one interferometric measurement channel, wherein the first and third optical delays are different and the second and fourth optical delays are different, and wherein values of the first, second, third, and fourth optical delays are configured to suppress crosstalk associated with the other of the first and second interferometric measurement channels in the one interferometric measurement channel over a predetermined length of the first and second waveguides.

21. The method in claim 20, wherein the processing by the computer of the signals includes suppressing crosstalk between the first and second interferometric measurement channels over a predetermined length of the first and second waveguides based on the first, second, third, and fourth optical delays.

22. The method in claim 17, wherein the measurement time period associated with the predetermined length is associated with a continuous strain measurement.

23. The method in claim 17, further comprising using Rayleigh scatter in the first and second waveguides to obtain the signals for processing.

24. The method in claim 17, further comprising using one or more Bragg gratings in the first and second waveguides to obtain the signals for processing.

25. The method in claim 17, wherein each of the optical waveguides corresponds to a core in a multi-core optical fiber, and wherein the cross coupling is due to defects in a multi-core structure of the multi-core optical fiber.

* * * * *